Dec. 8, 1959 P. A. PEARSON 2,916,640
PULSE GENERATOR
Filed Oct. 13, 1958 2 Sheets-Sheet 1

INVENTOR.
PAUL A. PEARSON,
BY John B. Davidson
ATTORNEY.

Dec. 8, 1959 P. A. PEARSON 2,916,640

PULSE GENERATOR

Filed Oct. 13, 1958 2 Sheets-Sheet 2

INVENTOR.
PAUL A. PEARSON,
BY John B. Davidson
ATTORNEY.

2,916,640
Patented Dec. 8, 1959

2,916,640

PULSE GENERATOR

Paul A. Pearson, Palo Alto, Calif.

Application October 13, 1958, Serial No. 766,810
15 Claims. (Cl. 307—106)

This invention relates to electrical pulse generators, and more particularly to a pulse generator for energizing a load wherein the energy consumed per pulse in the resistive component of the load is a small fraction of the total energy required to charge the total capacitance of the load, stray capacitances, and the distributed capacitances of a pulse transformer that may be used therewith.

In the more usual pulse-forming circuits, the energy stored in the output capacitance during the formation of a pulse is of relatively minor importance, and therefore, is allowed to be dissipated during and after the pulse in the circuitry. If this were allowed in the load circuit of interest to this invention, the total power consumption of the pulse circuit could be orders of magnitude larger than the useful power output and the minimum necessary component losses during the pulse. This invention provides a means for recovering most of the energy that goes to charge up the output capacitance by returning this energy to the energy storage element of the circuit during each pulse. Since this energy is available for reuse during the next pulse, the power necessary from the prime energy source is reduced to a low value; namely, the sum of the useful output power, the losses of components, and the energy in the circuit which is not successfully returned to the storage element.

A more complete understanding of the invention may be had from the following description thereof when taken in connection with the accompanying drawings, wherein.

Figure 1:
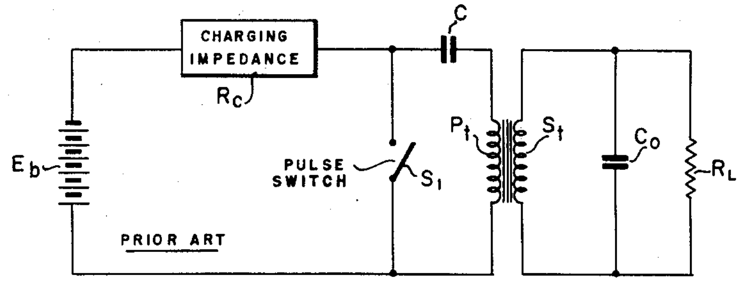
Fig. 1 is a schematic diagram of a prior art circuit for producing high voltage pulses.
Figure 2:
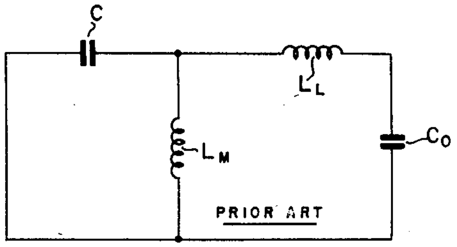
Fig. 2 is an equivalent circuit diagram of the pulsing part of the circuit with switch $S_1$ closed.
Figure 3:
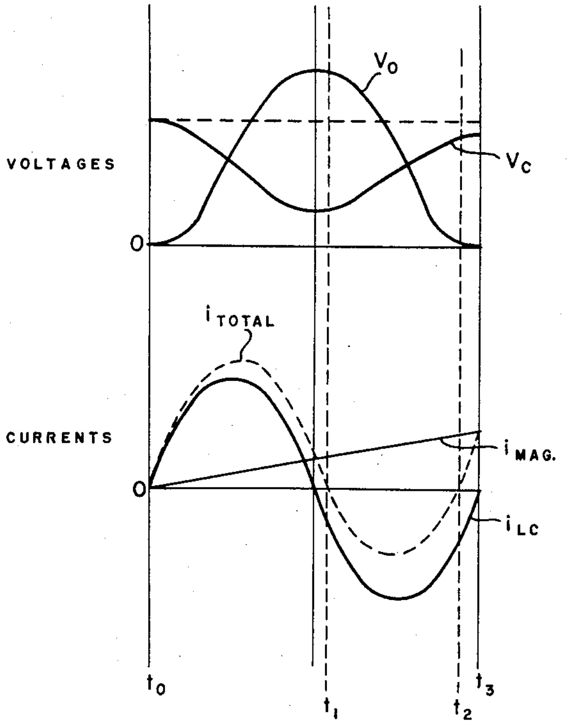

Fig. 3 presents waveform representations of voltages and currents in the circuit of Fig. 2 as a function of time, which waveform representations are useful in understanding the operation of the circuits of Figs. 1 and 2.

Figure 4:
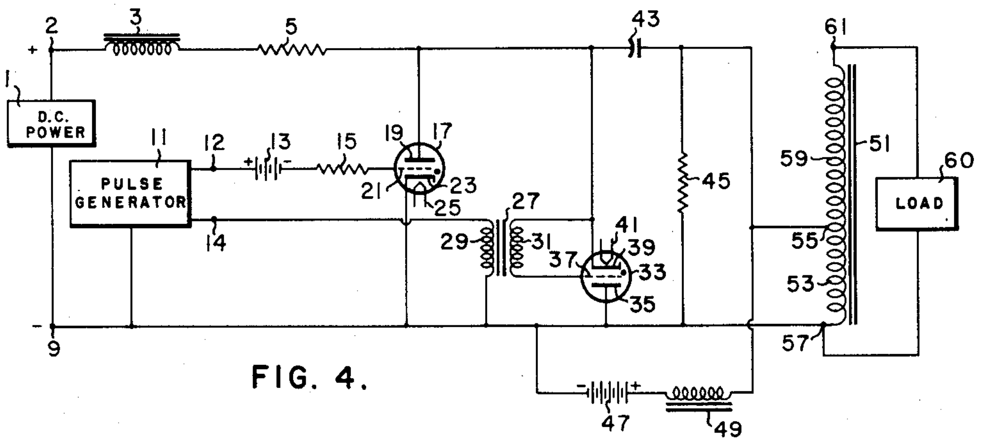

Fig. 4 is a schematic diagram of an embodiment of the present invention; and

Figures 5A, 5B, 5C:
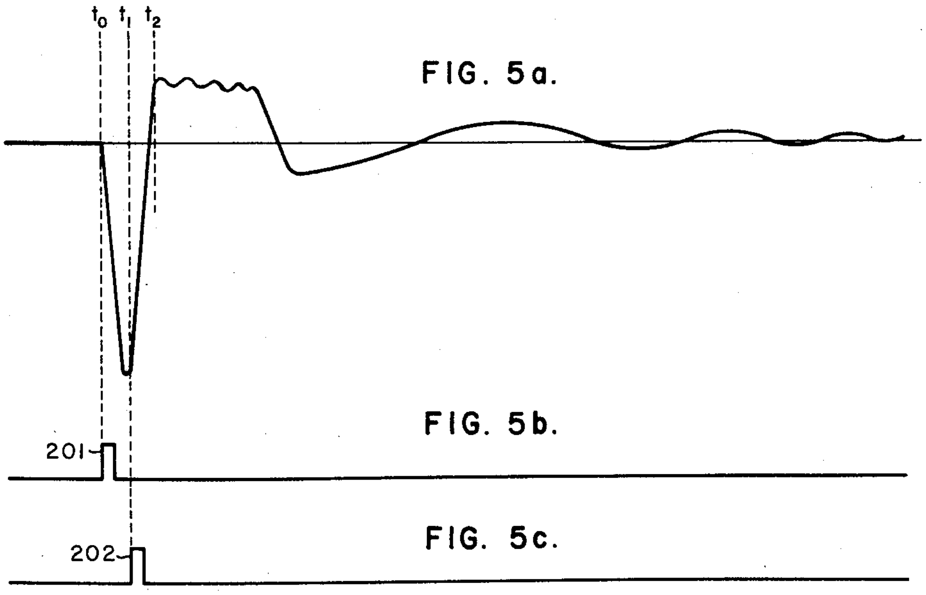

Figs. 5*a*, 5*b*, and 5*c*, respectively, are waveform representations of the voltages at terminal 61, thyratron grid 21, and thyratron grid 37 of the circuit of Fig. 4.

The prior art pulse-producing circuit shown in Fig. 1 includes a source of direct current $E_b$, a charging impedance $R_c$, and the primary winding $P_t$ of a step-up pulse transformer, all connected in a series loop in the order named. A switch $S_1$, which may be an electronic switch such as a thyratron, is connected so as to discharge storage capacitor C into transformer primary winding $P_t$. A load comprising a resistive component $R_L$ and a capacitive element $C_o$ is connected across the secondary winding $S_t$ of the pulse transformer.

Operation of the circuit of Fig. 1 is as follows: At some time after the charging current from the power supply $E_b$ drops to zero after completing the charging cycle following a preceding pulse, the pulse switch is closed (at time $t=t_o$, Fig. 3). The equivalent pulse circuit then applicable for the pulse voltages and currents is shown in Fig. 2. $L_L$ is the leakage inductance of the pulse transformer and $L_M$ is the magnetizing inductance. The load resistance and the equivalent loss resistances that are also in the circuit are omitted since they are of minor importance in the action of the circuit. All of these components are referred to one side of the pulse transformer in this circuit.

The output voltage $v_o$ across the capacitance $C_o$, the storage capacitor voltage $v_c$, and the currents in the pulse circuit are shown in Fig. 3. If the switch remained closed, the waveforms, would continue on in an oscillatory fashion. One should note that the output pulse is a sine wave. Also, the drop in storage capacitance voltage follows a sine wave pattern.

If a conventional unidirectional pulse switch, such as a hydrogen thyratron, is used, conduction would cease at time $t_1$ since the thyratron cannot conduct in the reverse direction. The output voltage at this time is near maximum, as is the energy stored in the output capacitance. The circuit to the storage capacitance is broken, so the energy cannot return to this component. What does happen is that the energy manifests itself in a damped sinusoidal voltage, starting at the voltage existing at the time thyratron conduction ceased, with a frequency determined by the output circuit inductance ($L_M$) and the output capacitance. This frequency is much lower than the frequency of the desired sine wave pulse, since $L_M$ in a well designed pulse transformer is much larger than $L_L$. Furthermore, again assuming an otherwise well designed, low loss pulse transformer, the damping will be small and the damped sine wave will be long, unless intentional damping is inserted. Unless intentional damping is provided, the entire energy stored in the output capacitance must be dissipated in the pulse transformer. Needless to say, if most of this energy is returned to the storage capacitor, the heating problem is reduced as well as conserving input power.

In accordance with the present invention, a second unidirectional switch is shunted across the first switch but in the reverse direction to make the circuit complete a full cycle. The time that conduction is initiated in the second switch is the time $t_1$ (see Fig. 3) when the first thyratron is stopping conduction. In practice, the timing may be advantageously varied around this point.

The second thyratron carries the current during roughly the second half cycle. It, too, will cease conduction when the current attempts to once again reverse. By this time, however, a large part of the energy stored in the output capacitance has been returned to the storage capacitor. If there were no magnetizing current, and losses and output power into the resistive component of the load were zero, then all the energy would be returned.

Refer now to the embodiment of the invention shown in Fig. 4. An electrical source 1 is shown coupled to a positive terminal 2 and a negative terminal 9 of an electrical network including serially connected inductor 3, resistor 5, capacitor 43, and parallel-connected transformer primary winding 53 and resistor 45, all connected in a series loop in the order named between terminals 2 and 9. Electrical source 1 may be a battery or a rectified and filtered direct current power supply. Capacitor 43 is the storage element of a charging network that also includes resistor 5, inductance 3, and power supply 1.

The secondary winding 59 of transformer 51 is electrically connected to terminal 55 of primary winding 53 so that transformer 51 is effectively an autotransformer. The voltage appearing between secondary terminal 61 and primary terminal 57 will be the sum of the voltages appearing across the individual windings 53 and 59 of transformer 51. The primary and secondary windings may be left separated when an autotransformer connection is not deemed desirable.

To prevent possible saturation of the core of transformer 51 by pulsing of the transformer in the manner described below, an electrical source 47, such as a battery, and an inductance 49 may be connected across primary winding 53 so as to drive the core of the transformer away from magnetic saturation in the sense to which it will be driven by uni-polarity pulses appearing across the primary winding of the transformer. The function of inductance 49 is to limit the pulse current flowing in the bias circuit.

Capacitor 43 is discharged through primary winding 53 by means of a switching means including thyratron 17 and trigger pulse generator 11. The plate electrode 19 of thyratron 17 is connected to capacitor 43, and the cathode 23 is connected to terminal 57 of winding 53. Pulses appearing at output terminal 12 of pulse generator 11 are coupled to the control electrode 21 of thyratron 17 through battery 13 and resistor 15. The function of the battery and resistor is to apply a bias to the control electrode 21 of the thyratron that is substantially below the firing voltage of the thyratron. The biasing circuit helps prevent accidental firing of the thyratron 17 except when voltages of greater than a given magnitude are applied to control electrode 21. After the plate of the thyratron has become negative with respect to the cathode, ionized gas remains in the tube for a short period of time. If the plate again becomes sufficiently positive with respect to the cathode before de-ionization has been substantially completed, the tube may conduct. A suitable negative bias applied to the control grid helps prevent this.

To recover energy stored in stray capacitances, transformer 51 and in load 60 coupled across the transformer output terminals, there is provided a second thyratron 33, the plate electrode 35 of which is connected to transformer terminal 57 and the cathode 39 of which is connected to capacitor 43. In effect, cathode 39 and plate electrode 35 are respectively connected to plate electrode 19 and cathode electrode 23 of thyratron 17. Pulses appearing at output terminal 14 of pulse generator 11 are applied between the control electrode 37 and cathode 39 of thyratron 33 by means of isolating transformer 27. The primary winding of transformer 27 is connected between terminal 14 and electrical source terminal 9, and the secondary winding 31 is connected between control electrode 37 and cathode 39. If desired, a biasing arrangement, such as shown with respect to thyratron 17, may be inserted in the control electrode cathode circuit of thyratron 33. The electrical return from the pulse generator 11 may be made by connecting the pulse generator to electrical source terminal 9.

Pulse generator 11 may be a conventional double pulse generator such as that manufactured by the Berkeley Division of Beckman Instruments, Inc., Model 4904. Each of the output pulses appearing on output terminal 12 are followed by an output pulse at terminal 14 delayed in time by an interval equal to at least a half-wave of the voltage appearing across transformer winding 53 as a result of the discharge of capacitor 43 through winding 53. The pulse applied to grid 37 can be timed to fire thyratron 33 as soon as the voltage at plate 35 swings positive with respect to cathode 39. If firing is delayed after this point, an ideal transformer (i.e., one with infinite magnetizing inductance) would allow the pulse to remain at the high voltage level, giving a flat-top pulse. The finite magnetizing inductance of practical transformers and the small resistive load current would cause the flat-top to droop. The amount of droop would depend on the actual magnetizing inductance and load resistance.

Trigger pulse 201 (see Fig. 5*b*) appearing at terminal 12 will fire thyratron 17 to discharge capacitor 43 through winding 53. The output pulse appearing at terminal 61 will be as shown in Fig. 5*a* starting at time $t_0$. At time $t_1$ (shortly after the output voltage has reached a negative peak), thyratron 17 will be extinguished by reversal in the polarity of the voltage between plate 19 and cathode 23 and a pulse 202 appearing at terminal 14 will be operative to fire thyratron 33. (The timing of pulse 202 may be advantageously varied around this point to find the most advantageous delay interval with respect to pulse 201.) Capacitive energy stored in transformer 51 and the load connected thereto as a result of the discharge of capacitor 43 through thyratron 33 will be returned to capacitor 43 through thyratron 33. At time $t_2$ (shortly after the primary voltage has reversed polarity), plate electrode 35 will become negative with respect to cathode 39 so that thyratron 33 will be extinguished and the energy-returning circuit to the pulse-forming network will be broken. In this case, a small amount of energy will remain in the capacitance of the transformer and load to produce a voltage at terminal 61 with an oscillatory waveform of gradually diminishing amplitude. Manifestly, the power required to charge capacitor 43 for the next discharge through primary 53 will be considerably reduced in magnitude.

The use of high vacuum switches could allow even this small remaining amount of capacitive energy to be reduced further still. The first switch would be pulsed "on" and it would carry current until the circuit current reversed. The second tube would then be turned "on" (it could possibly be turned on at the same time as the first tube, since it cannot conduct anyway for the first half cycle; likewise the first tube does not need to be turned "off" for the same reason). The second tube carries current through the second half cycle. When the total current attempts to reverse again, the first tube is again turned "on" (or left "on" in case it was not turned "off") and then carries current until the output voltage (and the stored energy) are brought to zero. At this point the first switch is turned off ($t=t_3$). Since now the output voltage is zero, or much closer to zero, the capacitive energy remaining in the circuit is much less and that much more is returned to the storage capacitor. Returning all but 2% of the energy would mean an increase of efficiency of 500% over a circuit that returned all but 10%.

In addition to the thyratron and the high-vacuum switch devices, there are semiconductor devices such as transistors which may serve the same purpose.

The pulse generator described above has been found to require substantially less power than similar devices known to the prior art. It has been found that a major part of the energy stored in the transformer and load 43 is returned to the storage capacitor after production of the desired output pulse. During a test of 30 minutes' duration during which the transformer produced 100 kv. pulses at 1140 p.p.s. thermometer readings on the transformer showed no measurable rise in temperature.

While it is not desired to limit the invention to any specific circuit constants, the following circuit constants are given as illustrative of values of circuit elements which may be utilized in the circuit of Fig. 4.

| | |
|---|---|
| Inductor 3 | 6 henrys. |
| Resistor 5 | 20,000 ohms. |
| Capacitor 43 | .02 microfarad. |
| Resistor 45 | 50,000 ohms. |
| Thyratrons 17 and 33 | Type 5C22. |
| Resistor 15 | 300 ohms. |
| Battery 13 | 67½ volts. |
| Battery 47 | 8 volts. |

The invention is not to be restricted to the specific structural details or circuit connections herein set forth, as various modifications thereof may be effected without departing from the spirit and scope of this invention.

What is claimed is:

1. A pulse generator comprising: a pulse transformer including at least a primary winding and a secondary winding; an electrical source; means, including storage capacitor means, connecting said electrical source to said primary winding; switch means connected in circuit relationship with said storage capacitor means and said primary winding for discharging said capacitor means into said primary winding; and unilateral conduction means connected in circuit relationship with said storage capacitor means and one of said transformer windings operative on the first reversal of primary current or voltage after each discharge of said capacitor means to conduct electrical energy from said transformer to said capacitor to assist said electrical source in recharging said capacitor means.

2. A pulse generator comprising: a pulse transformer including at least a secondary winding adapted to be connected to a load, and a primary winding; a direct current source; means, including storage capacitor means, connecting said direct current source to said primary winding; means for discharging said capacitor means into said primary winding to produce a voltage across said secondary winding; means connected to said transformer operative on the first reversal of primary current or voltage after each discharge of said capacitor means to conduct energy from said transformer and load to said capacitor means to assist said direct current source in recharging said capacitor means.

3. A pulse generator comprising: a pulse transformer including at least a primary winding and a secondary winding; a direct current source, an impedance means including a capacitor in series-loop relationship with said primary winding; means for discharging said capacitor into said primary winding comprising a first electrical valve means coupled to said capacitor and to said primary winding; said first electrical valve means including at least one control electrode and being adapted when conducting to couple said capacitor across said primary winding and adapted to cease conduction when the voltage across or current into said primary winding reverses direction; means for biasing said first electrical valve means to cutoff; second electrical valve means coupled to said capacitor and to said primary winding, said second electrical valve means including at least a control electrode and adapted when conducting to couple said capacitor across said primary winding when the voltage across said primary winding and said capacitor is of opposite polarity to the voltage thereacross when said capacitor is discharging into said primary winding; said second electrical valve means being further adapted to cease conduction when the voltage across said primary winding and said capacitor is of the same polarity as when said capacitor is discharging therethrough; and pulse generating means coupled to the control electrodes of said first and second electrical valve means for periodically initiating conduction of said first and second electrical valve means in spaced-time relationship.

4. A pulse generator comprising: a pulse transformer including at least a primary winding and a secondary winding; a direct current source and a capacitor in series-loop relationship with said primary winding; first and second electrical valve means each having at least an anode, a cathode, and a control electrode, the anode and cathode electrodes of said first electrical valve means being respectively connected to the cathode and anode electrodes of said second electrical valve means; said first electrical valve means coupling said capacitor across said primary winding so as to discharge said capacitor through said primary winding when said first electrical valve means is conducting; said second electrical valve means coupling said capacitor across said primary winding when said second electrical valve means has conduction started simultaneously with existence of a voltage across said primary winding opposite in polarity to the voltage thereacross when said capacitor discharges thereinto; means for repetitively controlling conduction of said first and second electrical valve means in spaced-time sequence with a predetermined interval between the initiating of conduction of said first electrical valve means and the initiating of conduction of said second electrical valve means, said predetermined interval being substantially equal to the time required for the voltage across said primary winding and said capacitor to reverse polarity; and means coupled to said primary winding for driving the core flux of said transformer away from magnetic saturation in the sense to which it is driven by the discharge of said capacitor through said primary winding.

5. A pulse generator comprising: a pulse transformer including at least a primary winding and a secondary winding; a direct current source and a capacitor in series-loop relationship with said primary winding; first and second electrical valve means each including at least an anode, a cathode, and a control electrode, the anode and cathode electrodes of said first electrical valve means being respectively connected to the cathode and anode electrodes of said second electrical valve means; said first electrical valve means coupling said capacitor across said primary winding so as to discharge said capacitor through said primary winding when said first electrical valve means is conducting; said second electrical valve means coupling said capacitor across said primary winding when said second electrical valve means has conduction started simultaneously with existence of a voltage across said primary winding opposite in polarity to the voltage thereacross when said capacitor discharges thereinto; and means for repetitively controlling conduction of said first and second electrical valve means in spaced-time sequence with a predetermined time interval between the initiating of conduction of said first electrical valve means and the initiating of conduction of said second electrical valve means, said predetermined interval being substantially equal to the time required for the voltage across said primary winding and said capacitor to reverse polarity.

6. A pulse generator comprising: a pulse transformer including at least a primary winding and a secondary winding; a direct current source and a capacitor in series-loop relationship with said primary winding; first and second electrical valve means each having at least an anode, a cathode, and a control electrode, the anode and cathode electrodes of said first electrical valve means being respectively connected to the cathode and anode electrodes of said second electrical valve means; said first electrical valve means coupling said capacitor across said primary winding so as to discharge said capacitor through said primary winding when said first electrical valve means is conducting; said second electrical valve means coupling said capacitor across said primary winding when said second electrical valve means has conduction started simultaneously with existence of a voltage across said primary winding opposite in polarity to the voltage thereacross when said capacitor discharges thereinto; and means for repetitively controlling conduction of said first and second electrical valve means in spaced time sequence with a predetermined interval between the initiating of conduction of said first electrical valve means and the initiating of conduction of said second electrical valve means.

7. A pulse generator for a load having capacitive reactance and a two-terminal input circuit; an electrical current source and capacitor means connected in a series-loop with said input circuit; means for periodically discharging said capacitor into said input circuit; and means periodically coupling said capacitor to said input circuit adapted to couple electrical energy in said load to said capacitor after each discharge of said capacitor through said input circuit.

8. A pulse generator comprising: a pulse transformer including at least a primary winding; circuit means, including a capacitive element, adapted to be charged from an electrical current source; means for discharging said capacitive element into said primary winding until the voltage across said primary winding and said capacitor reverses in polarity; and means coupling said transformer to said circuit means upon said reversal in polarity of said voltage across said primary winding and said capacitor, adapted to conduct electrical energy from said transformer means to assist said electrical current source in recharging said capacitive element.

9. A pulse generator for supplying pulse energy to a load, comprising energy storage means having at least a pair of terminals, a pulse transformer including a primary winding having at least a pair of terminals, one terminal of the energy storage means being coupled to one terminal of the primary winding, a source of electrical energy for supplying energy to the electrical storage means, first and second unidirectional switching means connected between the other terminals and arranged to conduct current in opposite directions, means for controlling said first and second unidirectional switching means whereby said first unidirectional switching means is switched to conduct current in one direction between the storage means and the primary winding to form an output pulse and said second unidirectional switching means is switched to conduct current in an opposite direction between the storage means and the primary winding for the same pulse to return energy to the storage means.

10. A pulse generator for supplying electrical pulse energy to an oscillatory load comprising energy storage means including a storage capacitor with at least a pair of terminals, a pulse transformer including a primary winding having at least a pair of terminals, said oscillatory load including said pulse transformer, one terminal of said storage means being coupled to one terminal of said primary winding, means for charging the storage unit, first unidirectional switching means having at least a control electrode connected between the other terminals and serving to conduct current in one direction between said energy storage means and said primary winding to thereby transfer energy from the energy storage means to the load for at least a portion of its conduction period, second unidirectional switching means having at least a control electrode connected between the said terminals and serving to conduct current in an opposite direction between said energy storage means and said primary winding to thereby transfer energy from the load to the storage means for at least a portion of the conduction period, and means for applying a control signal to the control electrodes of said first and second unidirectional switching means.

11. A pulse generator as in claim 10 wherein said control means serves to render both of said unidirectional switching means non-conductive when the energy transferred from the load to the storage means reaches a maximum.

12. A generator as in claim 10 wherein said second unidirectional switching means is rendered conductive a predetermined period of time after the first unidirectional switching means becomes non-conductive.

13. Apparatus as in claim 10 wherein said unidirectional switching means comprises a vacuum tube having at least a control electrode.

14. Apparatus as in claim 10 wherein said switching means comprises a semiconductive device having at least a control electrode.

15. Apparatus as in claim 10 wherein said switching means comprises a thyratron having a control electrode.

No references cited.